Dec. 16, 1930.  J. B. J. A. VIGNERON  1,785,236
TRAWLING GEAR
Filed March 28, 1929    2 Sheets-Sheet 1

INVENTOR:
Jean-Baptiste Joseph Alphonse Vigneron
BY Ruego, Boyer & Bakelar
ATTORNEYS

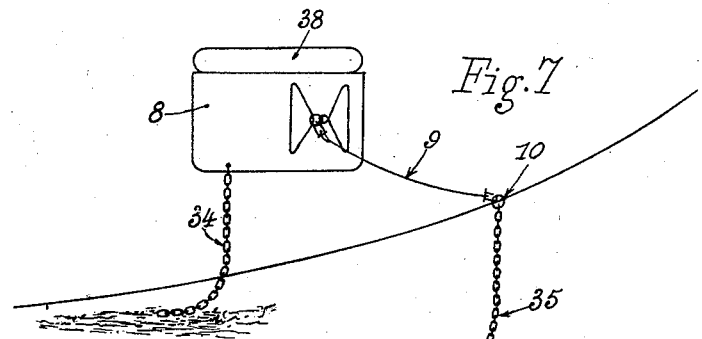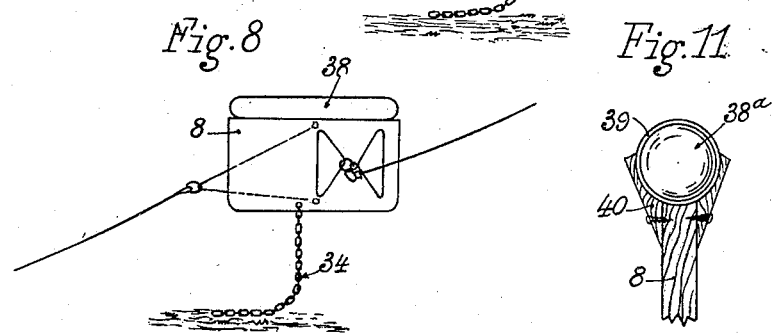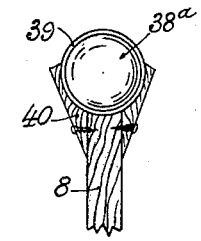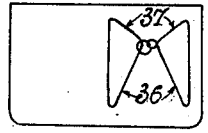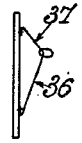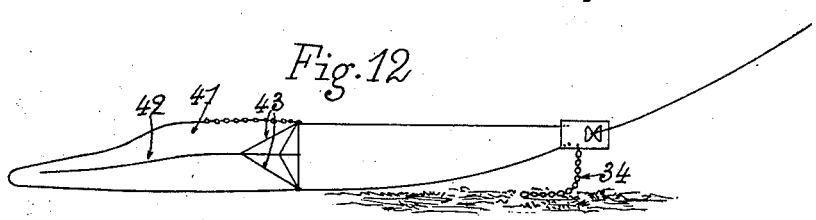

Patented Dec. 16, 1930

1,785,236

UNITED STATES PATENT OFFICE

JEAN-BAPTISTE JOSEPH ALPHONSE VIGNERON, OF LA ROCHELLE, FRANCE, ASSIGNOR TO V. D. LIMITED, OF LONDON, ENGLAND

TRAWLING GEAR

Application filed March 28, 1929, Serial No. 350,527, and in France May 16, 1928.

The invention relates to improvements in or modifications to the trawling gears claimed in the prior specification No. 251,955 filed by the applicant on Feb. 4, 1928.

The present invention has chiefly for its object to improve such trawling gears for the purpose of facilitating the operation of launching the net and hauling the net on board, of securing the proper adjustment of the distance at which the shear boards operate above the ground and the maximum spacing of the shear boards in operation.

Further objects of the invention will be set forth in the following description, with reference to the drawing, wherein:

Fig. 7 shows a shear board connected with the towing hawser by a connecting cable with hanging chains for steadying the operative position of the shear board.

Fig. 8 is a view similar to Fig. 7, showing a modification.

Figs. 9 and 10 are views similar to Figs. 2 and 3, respectively, showing a modified form of brackets.

Fig. 11 is a cross-section of the upper part of a shear board provided with a glass float and protecting members.

Figs. 12 and 13 are elevational views of trawling gears according to the invention, deprived of stretching slats.

The trawling gear according to the invention, which is quite similar to the gear described in the prior specification above referred to, comprises a ground net, two shear boards adapted to operate at a short distance above the ground, comparatively long net, cables connecting said shear boards with the net wings, and two towing hawsers 7, towed by a single boat.

Figure 1:
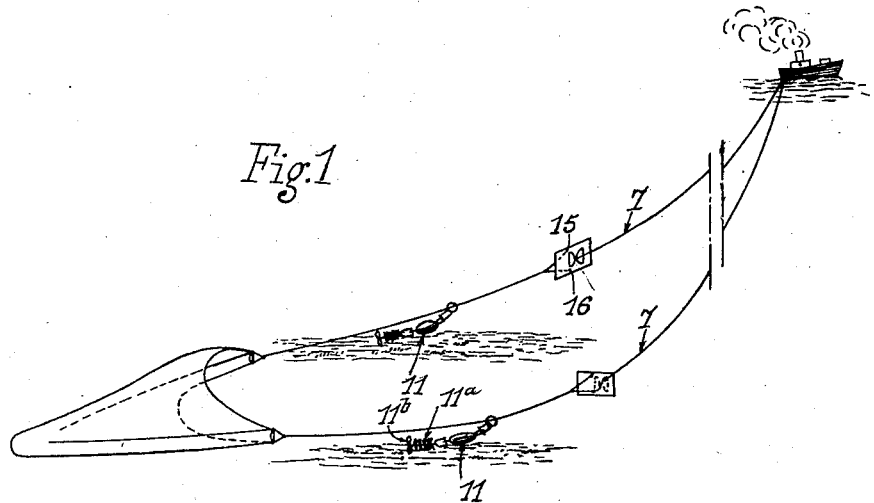
Fig. 1 is a perspective view of a trawling gear according to the invention, wherein the shear board is inserted between the net cable and the towing hawser.

In the form of construction shown in Figure 1, the end of the towing hawser 7 is directly attached to the point of junction of the two rigid brackets or of the crow foot connections of the shear boards, while the portion of cable situated between the net and the shear boards, instead of being attached to the said point of junction of the brackets, as in the construction described in the prior specification above referred to, is now attached on the outer face of the shear board by means of a crow foot whose attaching points 15—16 are situated at the top and bottom of the shear boards and practically on the same vertical line as the rigid rear bracket 22, that is, at the middle of the shear board in the longitudinal direction, or adjacent this point. Due to this arrangement, when the trawling gear is immersed in the water, the hawser and cables are drawn down by the resistance of the water, and by the weight of the net, by the weight of said cables and by the weight of the ballasting members 11; said cables will tend to assume a straight line position, and the shear boards are thus caused to immediately assume their proper angle of incidence and are thus spread apart at once.

The upper strand of the crowfoot is preferably longer than the lower strand, so as to provide for the horizontal position of the shear boards. For the same purpose, that is, in order that the shear boards should operate vertically and thus assume a maximum spacing from one another, the brackets may be disposed at a higher point than usual, or the lower rigid or flexible portions 36 of the brackets may be given a greater length than the upper portions 37 (Figures 9 and 10).

The attaching point of the towing hawser upon the shear board should be adjusted in the lengthwise direction in such manner as to secure the proper angle of incidence providing for the greatest spacing of the boards and the least resistance.

To facilitate the winding of the cables upon the winch on board, the shear board is preferably provided at the centre (Figs. 2 and 3) with an aperture 24, through which extends a pennant 25, connecting the hawser 7 to the net cable 26. The net cable 26 is slidable in a ring 27 secured at the connecting point of the two strands of the crow foot 28, at the rear of the boards. At the end of cable 26, which is connected to the intermediate pennant 25, I provide a stop member 29 adapted to engage the ring 27 of the said crow foot. Due to this arrangement, the net cable 26, situated in the rear of the towing hawser 7, may be readily wound on the winch when the trawling gear is being hauled on board.

Figure 4:
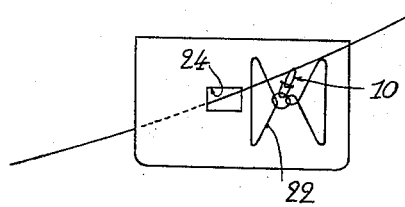
Fig. 4 is a view similar to Fig. 2, showing a modification.

In the modification of Fig. 4, a single cable directly connects each net wing to the net. Said cable, to which is attached a ring 10 where the shear board is to be attached, passes through an aperture 24, formed lengthwise of the shear board, adjacent the attaching line of the rear rigid bracket 22, that is near the centre of the shear board. Said ring 10 may be connected to the attaching point of the brackets by means of a shackle. This arrangement also facilitates the launching and hauling operations of the trawling gear.

Figure 5:
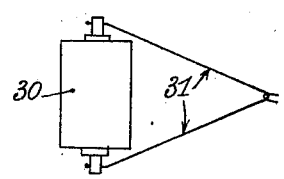
Fig. 5 shows a roller serving as ballasting member for the hawsers.

The weight 11, by which the net cable 26 is caused to drag upon the ground may consist, as shown in Figure 5, of rollers 30 of cast iron or the like, of suitable weight, each roller being mounted in a frame 31 of triangular or other shape, whose apex is attached to the net cable 26. Such rollers will roll upon the ground instead of rubbing thereon, thus offering less resistance to travel.

Said rollers, as well as the various ballasting members hereinbefore or hereinafter described may be provided with suitable devices such as cylindrical wire brushes 11ª (Fig. 1) of the kind commonly employed for chimney cleaning, the said brushes being attached by means of turnbuckles and optionally provided at the rear with a propeller 11ᵇ imparting rotation thereto; the raising of clouds of mud by which the fish are driven into the net is thus efficiently assisted. It is obvious that the ballasting members may also consist of any other suitable heavy objects, such as a chain or a bundle of chains attached by one end, etc.

Figure 6:
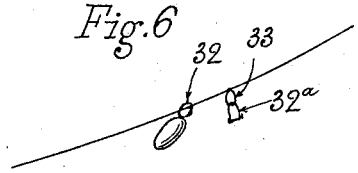
Fig. 6 shows a portion of a towing hawser with the means for attaching the ballasting member.

All such ballasting members may be permanently secured in place; however, they will preferably be attached to a ring 32 (Fig. 6) which is slidable along the hawser. During the fishing operation, said ring is attached, by a shackle 32ª, to a ring 33 permanently attached to the hawser; when the gear is to be hoisted on board, ring 32 is detached from ring 33, and the hawser can thus be continually wound upon the winch, the hawser running through ring 32 until the net wings attain the supports which serve to suspend the net on board. The ballasting members then engage the spreading slats. The trawling gear is launched by the reverse operation.

As above specified, it is preferable, while giving to the shear board the necessary buoyancy, to secure its vertical position in operation by ballasting its lower part and by increasing its lifting power at the top, by means of a float or the like.

In certain cases, the ballasting member 11 may be dispensed with, the contact of the shear boards with the ground being assured by the weight of the cables, which should now be made longer and heavier.

When the shear board is attached to the towing hawser by a connecting cable running from the brackets (Fig. 7), the shear board is liable to oscillate from the front to the rear about the attaching point 10 of the rope 9, since it is not maintained at the rear, as in the example shown in Figure 1. If the oscillations of the two shear boards on both sides of the net are different, the distance of the boards above the ground will be different, thus interfering with the proper operation and control of the trawling gear. The stable equilibrium of the shear boards 8 in the water and their proper operation at a constant distance above the ground may be obtained by ballasting the lower rear part of the shear board by means of a hanging chain 34 (Fig. 7) whose attaching point and weight are determined according to the normal height at which the boards should operate, such a chain acting after the manner of the guide ropes used with aircraft.

Any other hanging members, suspended from the board and adapted to drag along the ground (such as a steel cable, a weight attached to a rope, or the like) may be used for this purpose.

In the arrangement of Fig. 7, in order that the point of junction 10 of the towing hawser with the cable 9 should be maintained at a practically constant distance above the ground, for instance at the same level as the shear board, and to secure a stable operation of the boards, a suitable chain 35 may be suspended from point 10.

Due to this arrangement, both shear boards will operate at the same distance above the ground. The boards are thus held in position and operate in a quite steady manner, the centre of gravity of the whole being situated at a very low point. When combined with the floats 38 with which the boards may be provided at the top, the boards will remain constantly vertical, and this affords the maximum spreading. The dragging chain, as well as the shear board itself (which operates close to the ground), will act concurrently with the cable 26 for raising clouds of mud guiding the fish toward the net.

Obviously, the ballasting arrangement embodying chains, cables, or the like may be used with the various constructions above-described.

In certain embodiments of the invention, a single chain may be provided, and its attaching point will be modified according to the construction employed. For instance, in the arrangement shown in Figure 7, the chain 35 may be dispensed with, and a single chain 34 is then attached to the rear of the shear board. In the arrangement shown in Figure 8, the chain is preferably attached near the middle point of the lower edge of the board, below the pivoting axis of the rear bracket. In certain cases two or more hanging and dragging chains, cables or the like may be disposed along the lower edge of the shear board, and their number and position will be modified according to the position of the attaching points of the hawser and net cable upon the board, which affects the equilibrium of the shear board.

The shear boards may obviously have any suitable size and shape.

In all the embodiments of the present invention, it is advantageous, in order to secure the vertical operation of the boards, to provide a powerful float at their upper part, as above specified. For fishing at great depths, such floats cannot be made of metal due to the high pressure; use will be made of glass balls 38$^a$ (Fig. 11) enclosed in one or more boxes or cases 39 of galvanized iron or the like; said cases or tubes are attached to the upper edge of the board 8, and are protected against shocks or damage by bevelled wooden pieces 40. Said pieces 40 also have the effect of preventing the said tubes from operating as kites, under the effect of the water, which would impair the proper balance of the shear boards.

In the various embodiments of the invention herein set forth, the brackets may be either rigid or flexible or they may comprise a rigid front part, adapted to facilitate the spreading of the net in width as soon as immersed into the water, and a flexible rear part, adapted to facilitate the handling of the board.

Figure 2:
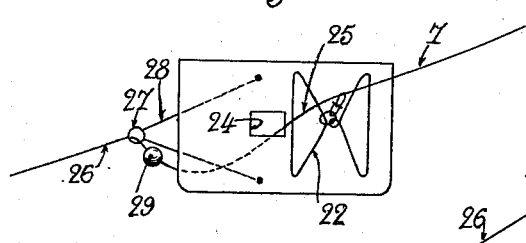
Figs. 2 and 3 are respectively an elevational view and an end view of a shear board provided with improved attaching means including a pennant for connecting the net cable and the towing hawser.
Figure 3:
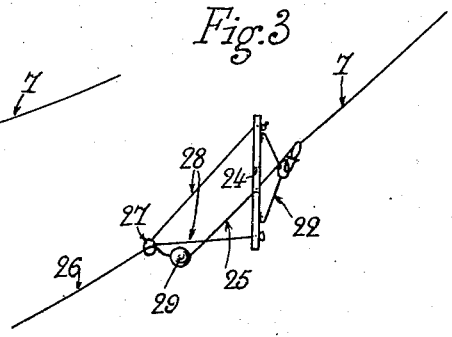

It is advisable to provide turnbuckles at all points where cables are attached to the shear boards as shown for example in Figures 2 to 4, at the point where the shear board is attached to the hawser, or as shown in Figure 7 at the point of connection between the pennant 9 and the shear board. The rope 9, the hawser and the net cable may be respectively attached by means of a turnbuckle to the ring 10. Due to the provision of said turnbuckles, the shear boards and adjacent parts preserve the proper position, notwithstanding the torsion of the cables and other disturbances during the fishing operation.

Figure 14:
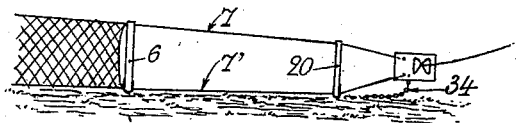
Fig. 14 shows a trawling gear according to the invention provided with stretching slats at the ends of the net wings and adjacent the shear boards.

In the apparatus shown in Figures 12, 13 and 14, comprising nets with very high wings (for instance of 7 or 8 meters width) whose vertical dimension is substantially equal to the height of the net mouth, the usual stretching slats may be dispensed with (Figs. 12 and 13), and the apparatus may comprise suspended chains 34 or the like attached to the shear board. Slats may however be provided at the ends of the wings, or adjacent the shear boards, or both at the ends of the net wings and adjacent the shear board, as shown by way of example in Fig. 14, in which the two cables 7 and 7' are attached to the slat 6 and are held apart by the slat 20.

The net 41 of Fig. 12 is preferably provided with side cables 42, each of which is connected to the upper and lower corners of the wings by inclined cables 43, so as to limit the lateral swelling of the net and provide for the maximum swelling in height.

In certain cases, shear boards may be disposed at the ends of the net wings, in substitution for the usual slats, and their weight will be effective in counteracting the tendency of the net to rise from the ground during the fishing operation.

Obviously, I may employ other constructions without departing from the principle of the invention.

Having now described my invention what I claim as new and desire to secure by Letters Patent is:

1. In a trawling gear, a net, a net cable connected to said net, a boat, a towing hawser connected to said boat, a buoyant shear board adapted to operate at a small distance above the ground, means for connecting said shear board with said net cable and hawser, a ballast member attached to said net cable adjacent said shear board and adapted to drag on the ground and a substantially cylindrical wire brush pivotally attached to said ballast member.

2. In a trawling gear as claimed in claim 1, a propeller attached to said wire brush for imparting rotation thereto.

3. In a trawling gear having buoyant shear boards adapted to operate at a small distance above the ground, a shear board, a casing secured to the upper edge thereof, a number of glass balls within said casing, and protecting members having surfaces merging in the faces of said shear board and in the thicker portions of said casing to prevent lifting action of water on said casing.

In testimony whereof I have signed my name to this specification.

JEAN-BAPTISTE JOSEPH ALPHONSE VIGNERON.